United States Patent [19]
Raza et al.

[11] Patent Number: 5,643,516
[45] Date of Patent: Jul. 1, 1997

[54] PROCESS FOR MANUFACTURING POLYURETHANE PRODUCTS

[75] Inventors: Irfan F. Raza, Utica; Ronald D. Walther, Algonac, both of Mich.

[73] Assignee: U.S. Farathane Corporation, Utica, Mich.

[21] Appl. No.: 308,942

[22] Filed: Sep. 19, 1994

Related U.S. Application Data

[63] Continuation of Ser. No. 105,393, Aug. 12, 1993, abandoned.

[51] Int. Cl.$^6$ .............................. B29B 7/38; B29B 9/02
[52] U.S. Cl. .................. 264/127; 264/141; 264/349; 525/125
[58] Field of Search .......................... 264/109, 118, 264/126, 127, 236, 349, 328.2, 141, 142; 525/125, 126, 127, 128, 129

[56] References Cited

U.S. PATENT DOCUMENTS

| | | | |
|---|---|---|---|
| 2,899,710 | 8/1959 | Hendry | 264/127 |
| 2,976,257 | 3/1961 | Dawe | 525/125 |
| 3,325,434 | 6/1967 | Tully | 264/127 |
| 3,457,234 | 7/1969 | Gianatasio | 264/236 |
| 3,658,752 | 4/1972 | Das et al. | 525/127 |
| 3,751,520 | 8/1973 | Yasuda | 525/127 |
| 4,567,088 | 1/1986 | Skogman et al. | |

FOREIGN PATENT DOCUMENTS

| | | | |
|---|---|---|---|
| WO88/04982 | 7/1988 | WIPO | 264/127 |

*Primary Examiner*—Mathieu D. Vargot
*Attorney, Agent, or Firm*—Lalos & Keegan

[57] ABSTRACT

A process of manufacturing an article having high load absorption, durability and wear resistance properties with increased lubricity including mixing particles of polyurethane and polytetrafluoroethylene, extruding the mixture of polyurethane and polytetrafluoroethylene particles, reducing the extruded polyurethane/polytetrafluoroethylene product to particle form and molding the polyurethane/polytetrafluoroethylene extruded particles to form the article in a selected configuration.

7 Claims, 2 Drawing Sheets

PROCESS FOR MANUFACTURING POLYURETHANE PRODUCTS

This is a continuation of application Ser. No. 08/105,393 filed on Aug. 12, 1993, now abandoned.

BACKGROUND OF THE INVENTION

This invention relates to a process for manufacturing a thermoplastic polyurethane product and more particularly to a process for manufacturing such a product suitable for use in automotive wheel suspensions systems.

Typically, conventional wheel suspension systems for automotive vehicles have consisted of a number of components linked together and provided with various elastomeric components such as bushings, bumpers, spacers, washers, mounts and the like which function to transmit motion, absorb shock loads and allow limited displacement between connected components. Initially, such elastomeric components were formed of rubber. It was found, however, that the use of rubber in such applications was unsatisfactory in that over a period of use, rubber will dryrot and tear under stress, resulting in failure and requiring replacement.

More recently, the material failure problem of rubber has been solved by the use of thermoplastic polyurethane materials which have not only a deflection rate curve comparable to rubber but also a high abrasion resistance, high tear strength and excellent shock absorption, coupled with hardness, a wide range of flexibility and elasticity, solvent resistance, especially to hydrocarbons, and excellent resistance to oxygen aging. Components formed of polyurethane materials are not only more durable than compounds made of rubber but weigh less and can be formed smaller to conserve space and energy in vehicles.

In the use of polyurethane materials in some wheel suspension components, however, it has been found that under dynamic loading, such materials have a tendency to squeak. It therefore has been desirable to provide a polyurethane material suitable for use as a wheel suspension system component which will not produce a squeaking sound under dynamic load conditions.

Accordingly, it is the principal object of the present invention to provide a novel process for manufacturing an improved product formed of a polyurethane material.

Another object of the present invention is to provide a novel process for manufacturing an improved product formed of a polyurethane material such as a bushing, bumper, spacer, washer, mount and the like.

A further object of the present invention is to provide a novel process for manufacturing various components such as bushings, bumpers, spacers, washers, mounts and the like suitable for use in wheel suspension systems of vehicles.

A still further object of the present invention is to provide a novel process for manufacturing an improved article formed of a polyurethane material which will not produce a squeaking noise under dynamic load conditions.

Another object of the present invention is to provide a novel process for manufacturing an improved component of a wheel suspension system, formed of a polyurethane material, which will not produce a squeaking noise during normal usage of such system.

A further object of the present invention is to provide a novel process for manufacturing a product formed of a polyurethane material having a high lubricity which is simple in procedure, economical in practice and highly effective in performance.

A still further object of the present invention is to provide an improved product formed of a polyurethane material.

Another object of the present invention is to provide a novel component for a wheel suspension system such as a bushing, bumper, spacer, washer, mount and the like, formed of a polyurethane material.

A further object of the present invention is to provide a novel article of manufacture formed of a polyurethane material which is functional under dynamic load conditions without producing squeaking noises.

Other objects and advantages of the present invention will become more apparent to those persons having ordinary skill in the art to which the present invention pertains from the following description taken in conjunction with the accompanying drawings in which:

DESCRIPTION OF THE PREFERRED EMBODIMENT

Figure 1:
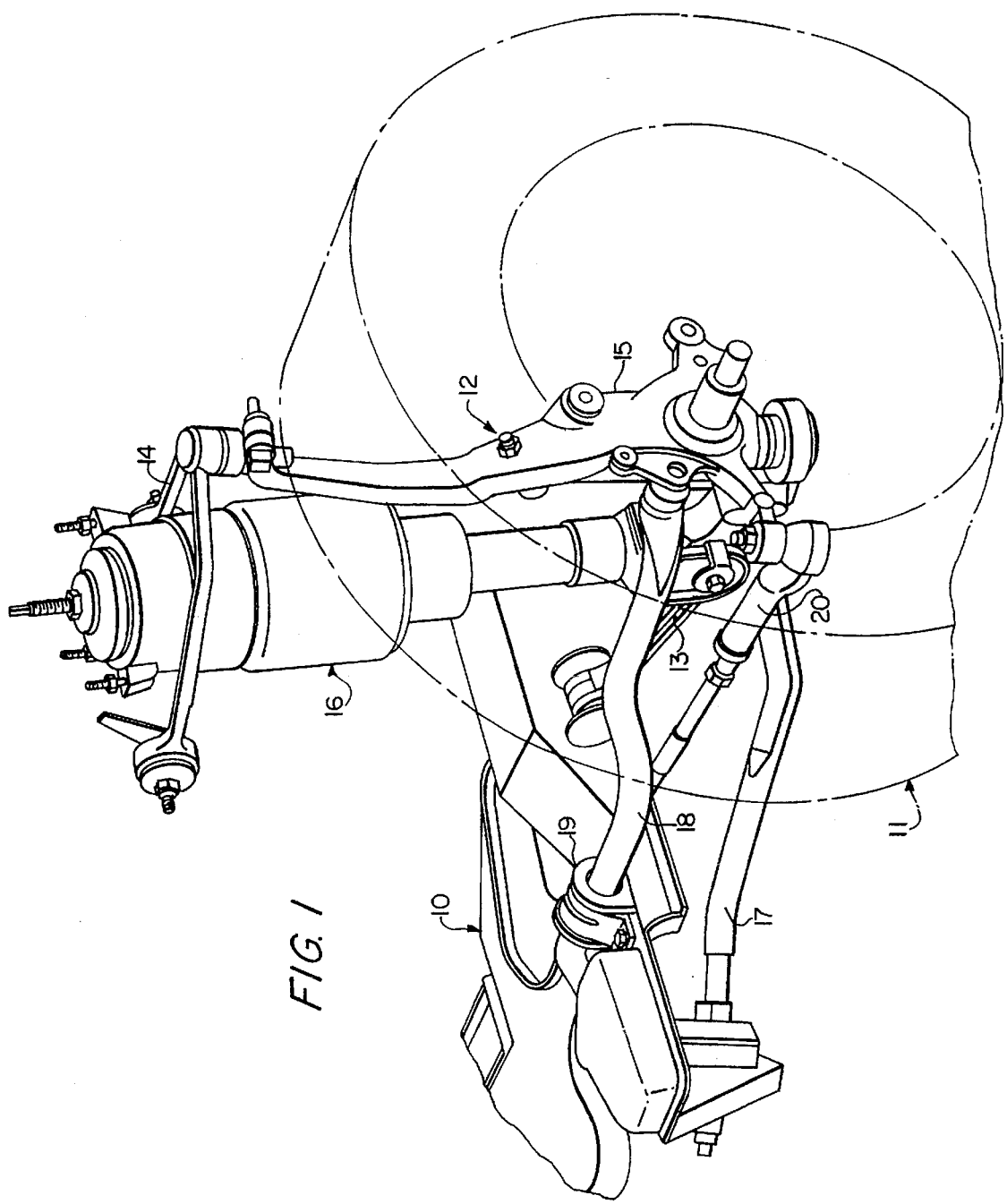
FIG. 1 is a prospective view of a front wheel suspension system of an automotive vehicle incorporating various components including bushings, bumpers, spacers, washers, mounts and the like embodying the present invention.
Figure 2:
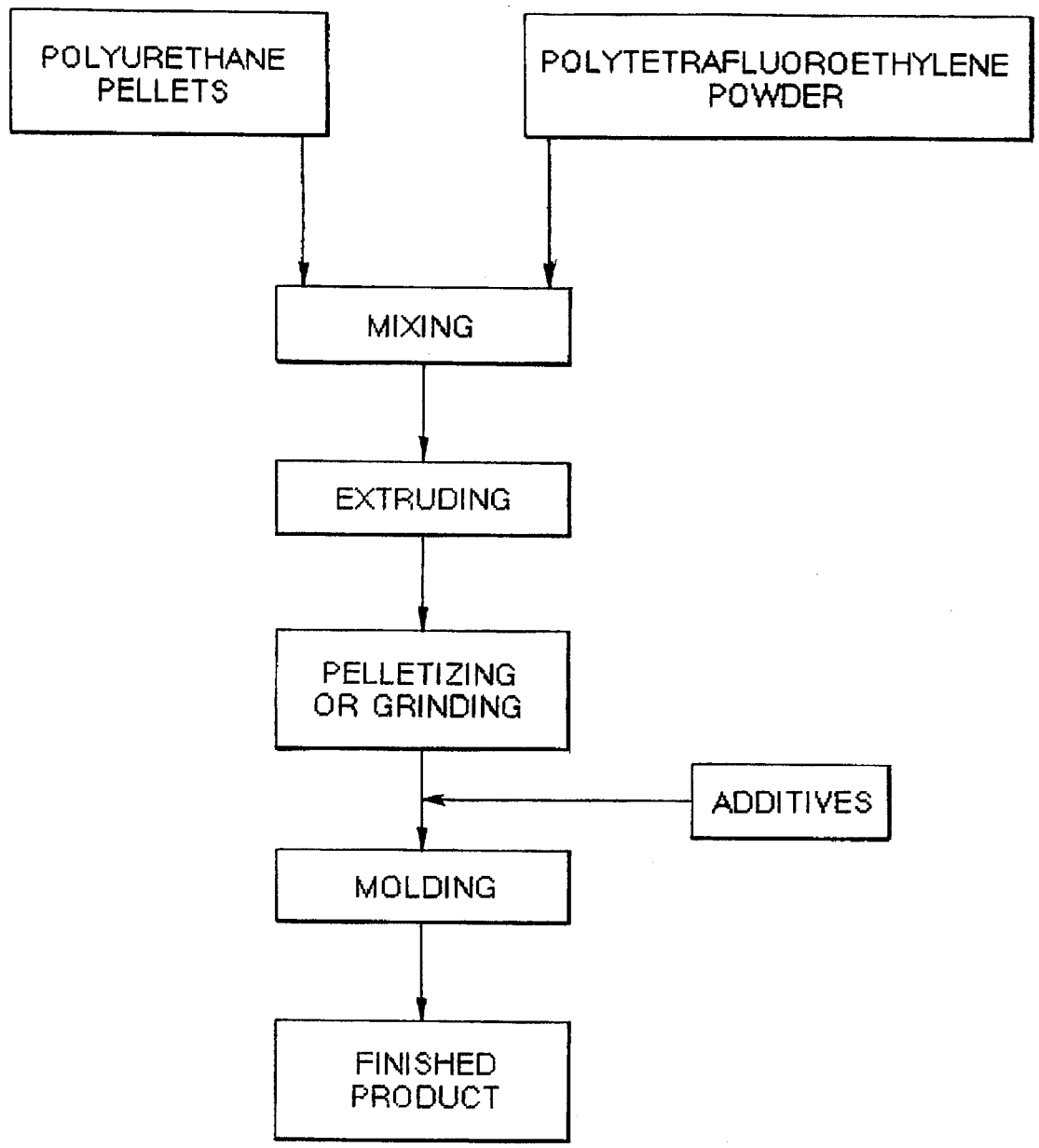
FIG. 2 is a flow diagram depicting the novel process of the invention.

Referring to FIG. 1 of the drawings, there is illustrated a portion of an automotive vehicle including a chassis 10, a wheel 11 and a suspension system 12 operatively connecting the wheel to the chassis, and incorporating various components embodying the present invention. The suspension system generally includes a lower control arm 13 pivotally connected at an inner end to the vehicle chassis, a yoke assembly 14 pivotally connected at an inner end to the chassis, a steering spindle 15 operatively interconnecting the outer ends of the lower control arm and the yoke assembly and a shock absorber 16 operatively interconnecting the lower control arm and an upper portion of the vehicle body. The system further is provided with a lower control arm 17 operatively interconnecting the lower control arm and the chassis, a sway bar 18 operatively interconnecting steering spindle 15 and a similar spindle on the other side of the vehicle and journaled in a mounting fixture seated on the chassis, and an idler arm 20 operatively interconnecting the steering spindle and the steering mechanism of the vehicle. Such operating components are provided with various bushings, bumpers, spacers, washers, and mounts formed of polyurethane which are subjected to dynamic loads imposed by the various operating components.

In wheel suspension systems of the type described, the use of polyurethane materials in components such as bushings, bumpers, spacers, washers, mounts and the like has been found to produce an undesirable squeaking noise under normal operating conditions. To eliminate such a noise condition, certain lubricants have been added to the polyurethane material in its preparation. A particularly effective lubricant additive has been found to be polytetrafluoroethylene manufactured and sold by E.I. Dupont De Numors & Company of Wilmington, Del. under the trademark TEFLON. Such material has been designed for use as an additive in plastics and elastomers. It improves lubricity and wear resistance of plastics and elastomers, and provides other desirable performance characteristics. Articles containing polytetrafluoroethylene have been known to have improved lubricity and reduced friction and wear compared to similar articles made without such an additive. Plastics in which polytetrafluoroethylene has been used successfully include polycetals, polyamides, polycarbonates, polyesters, polysulfides and polysulfones. Elastomers in which polytetrafluoroethylene has been used successfully include acrylates, fluoroelastomers, neoprenes, nitrides and silicones. There has been no documented use, however, of polytetrafluoroethylene in thermoplastic polyurethanes.

In attempting to form thermoplastic polyurethane parts with a polytetrafluoroethylene additive for improving lubricity and correspondingly eliminating a squeaky noise problem in the end product, polytetrafluoroethylene powder was first added to ground thermoplastic polyurethane material and then injection molded. Because of a non-homogeneous mixing of the polytetrafluoroethylene and the thermoplastic polyurethane, the molded parts were required to be reground and injection molded a second time to achieve satisfactory dispersion of the polytetrafluoroethylene within the molecular structure of the thermoplastic polyurethane. While such process achieved an acceptable product, the added injection molding step in the process was found not to be feasible in a production environment.

The next method investigated in seeking to add the polytetrafluoroethylene to the thermoplastic polyurethane to provide a homogeneous dispersion of the polytetrafluoroethylene was to add the polytetrafluoroethylene in the process of forming the thermoplastic polyurethane compound. Such method was found not to be effective in that the polytetrafluoroethylene contains an acid fluoride molecule which functions to hinder the chemical reaction in the formulation of the polyurethane compound. Additional amounts of catalyst were added to accelerate the reaction but the exothermic reaction required an excessive amount of time to reach casting temperature.

Following such unsuccessful or unfeasible procedures it was found that a product consisting of thermoplastic polyurethane having polytetrafluoroethylene uniformly dispersed throughout the molecular structure thereof could be formed by the inventive process of mixing polytetrafluoroethylene powder with thermoplastic polyurethane pellets, extruding the mixture of thermoplastic polyurethane pellets and polytetrafluoroethylene powder, pelletizing or grinding the resultant extrusions and then molding the pelletized or ground material to form an end product.

As an example of the use of the process as described to form a radius arm bushing for a vehicle wheel suspension system, 12% by weight of fine polytetrafluoroethylene powder having an average particle size in the range of 8 to 10 microns was added to 15 pounds of a commercial grade of polyurethane pellets, mixed and extruded. The extruded material was then ground and the ground material was injection molded to produce the end part. The end products were then life tested by applying a compressive sinesoidal load of 0 to 1200 pounds at a cycle speed of 88 cycles per minute and at an ambient temperature of 23° C. Such components were tested to a minimum of 110,000 cycles. No evidence of excessive wear or cracks were noticed in any of the tested components.

In the practice of the process as described, any commercial grade of polyurethane material can be used along with any commercial grade of polytetrafluoroethylene material. Preferably, no greater than 12% by weight of the polytetrafluoroethylene should be used. Greater amounts of the polytetrafluoroethylene have a tendency to settle out. The particle size of the polytetrafluoroethylene should be in the range of 8 to 15 microns. Various fillers such as molybdenum disulfide, glass and the like can be used to impart various other properties to the end product. The particular polyurethane material used successfully was formulated in the conventional manner of mixing a polyester material with an isocyanate material for 4 to 5 minutes at a high speed until the composition reached a casting temperature.

Polyurethanes are characterized by the urethane linkage (—NHC—C═O). This typical linkage is formed by the reaction of an isocynate group (R—N═C═O) with a hydroxyl containing compound (R—OH). While reaction with a hydroxyl compound is primary, isocynates will also react with any compound containing an active hydrogen atom. Therefore, functional groups such as urea, amide, allophanate, biuret, and other groups may become important parts of the polyurethane polymer. In addition, most of the hydroxyl containing compounds are polymers in themselves. These are generally polyethers and polyesters, but other hydroxyl containing polymers, such as castor oil, can be part of the polyurethane complex.

In formulating a urethane compound, there are several different types of materials that either must be or can be used. These materials can generally be classified into the following: isocyanates, polyols, chain extenders, catalysts, blowing agents, functional additives, fillers and non-functional additives. All of these, with the exception of the fillers and non-functional additives, comprise the polymer network where their independent structures react into and become an integral part of the resultant urethane polymer. This polymer structure is responsible for the basic physical nature of the polyurethane, i.e., its strength, elasticity, toughness, resiliency, and other physical characteristics.

Fillers and non-functional additives do not enter into the polymer reaction, but do affect the physical nature of the final urethane compound. Although these latter additives are not reacted or chemically bound to the polymer structure, they are held by the polymer structure by physical entrapment and, in some cases, by secondary chemical association.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I, claim:

1. A process of manufacturing an article having high load absorption, durability and wear resistance properties with improved lubricity, comprising:

mixing particles of polyurethane and polytetrafluoroethylene; extruding the mixture of polyurethane and polytetrafluoroethylene particles;

reducing the extrudate of polyurethane/polytetrafluoroethylene to particle form; and molding the reduced extrudate of polyurethane/polytetrafluoroethylene particles to form the article.

2. The process according to claim 1 wherein powdered polytetrafluoroethylene is mixed with pelletized polyurethane.

3. The process according to claim 1 wherein the content of polytetrafluoroethylene particles is no greater than 12% by weight of the polyurethane particles.

4. The process according to claim 1 wherein the particle size of the polytetrafluoroethylene is in the range of 5 to 10 microns.

5. The process according to claim 1 wherein the extrudate of polyurethane/polytetrafluoroethylene is pelletized.

6. The process according to claim 1 wherein the extrudate of polyurethane/polytetrafluoroethylene is ground.

7. The process according to claim 1 wherein the reduced extrudate of polyurethane/polytetrafluoroethylene particles is injection molded to form the article.

* * * * *